(12) United States Patent
Fujiwara et al.

(10) Patent No.: US 7,000,872 B1
(45) Date of Patent: Feb. 21, 2006

(54) CIRCULAR PARACHUTE

(76) Inventors: Nobuyuki Fujiwara, 28261 Red Gum Rd., Lake Elsinore, CA (US) 92532; Brian D. Johnson, 41573 Avenida de la Reina, Temecula, CA (US) 92592

( * ) Notice: Subject to any disclaimer, the term of this patent is extended or adjusted under 35 U.S.C. 154(b) by 0 days.

(21) Appl. No.: 10/769,151

(22) Filed: Jan. 30, 2004

(51) Int. Cl.
*B64D 17/00* (2006.01)
(52) U.S. Cl. .................................................... 244/142
(58) Field of Classification Search ............... 244/142, 244/143, 145, 146, 147
See application file for complete search history.

(56) References Cited

U.S. PATENT DOCUMENTS

| | | | | |
|---|---|---|---|---|
| 1,485,400 A | * | 3/1924 | Lucas | 244/145 |
| 2,214,569 A | * | 9/1940 | Morders et al. | 244/145 |
| 2,258,797 A | * | 10/1941 | Overbeke | 244/145 |
| 2,365,230 A | * | 12/1944 | Volf | 244/142 |
| 2,404,659 A | * | 7/1946 | Rohulick | 244/145 |
| 2,523,276 A | * | 9/1950 | Buhler | 244/142 |
| 2,770,432 A | * | 11/1956 | Stevinson | 244/145 |
| 3,228,636 A | * | 1/1966 | Lemoigne | 244/145 |
| 3,385,539 A | * | 5/1968 | Ewing et al. | 244/142 |
| 3,434,680 A | * | 3/1969 | Ferguson | 244/142 |
| 3,655,151 A | * | 4/1972 | Ferguson | 244/142 |
| 3,931,945 A | * | 1/1976 | Sepp | 244/145 |
| 4,607,813 A | * | 8/1986 | Jeswine | 244/145 |
| 4,623,109 A | * | 11/1986 | Sadeck | 244/152 |
| 4,730,796 A | | 3/1988 | Puskas | |
| 4,844,384 A | * | 7/1989 | Barish | 244/142 |
| 4,863,119 A | * | 9/1989 | Case et al. | 244/152 |
| 5,174,527 A | * | 12/1992 | Kasher | 244/145 |
| 2001/0050323 A1 | * | 12/2001 | Brownell | 244/142 |
| 2003/0038215 A1 | * | 2/2003 | Benney et al. | 244/145 |

* cited by examiner

*Primary Examiner*—Michael J. Carone
*Assistant Examiner*—S. A. Holzen
(74) *Attorney, Agent, or Firm*—Loyal McKinley Hanson

(57) ABSTRACT

A circular parachute includes a circularly shaped canopy having a skirt band and a plurality of cascaded, Y-shaped main suspension lines connected to the skirt band that converge downwardly to a suspension line junction. Each main suspension line includes a lower segment that branches into at least two upper segments. One embodiment includes a canopy with a vent band and Y-shaped vent suspension lines that converge downwardly to a vent centerline. A generally planar reefing device for slowing the opening of the canopy defines a plurality of openings through which the main suspension lines extend. In one reefing device embodiment, a strip of material (e.g., a nylon strap) is folded into multiple strip segments arranged in a five-point star configuration. Eyelets in the form of brass grommets extending through the strip segment junctions form suspension-line-receiving openings.

8 Claims, 6 Drawing Sheets

CIRCULAR PARACHUTE

BACKGROUND OF THE INVENTION

1. Technical Field

This invention relates generally to parachutes, and more particularly to a circular parachute.

2. Description of Related Art

A typical circular parachute includes a canopy to which a set of suspension lines is attached. The suspension lines connect the canopy to a harness that attaches to a person, cargo, or other load. Air inflates the canopy during descent and the drag provided reduces speed.

The canopy of a circular parachute (i.e., a round parachute) is commonly made of a circularly shaped nylon fabric (i.e., the canopy fabric). The canopy of the flat circular type has an outer perimeter that forms a circular configuration when the canopy is laid flat upon the ground. When fully inflated, the canopy usually takes the shape of a hemispherical cap, although in some cases, the cap is slightly conical and in others, slots or concentric gaps are provided in the canopy that enhance stability. A circularly shaped central opening is often provided in the canopy to form a vent at the apex of the canopy. The circularly shaped marginal edge portion of the canopy along the perimeter of the vent is sometimes referred to as the "vent band" of the canopy, while the circularly shaped marginal edge portion of the canopy along the outer perimeter is sometimes referred to as the "skirt band."

Suspension lines nowadays are commonly nylon too, although some use materials available under the trademarks KEVLAR and SPECTRA. They function to suspend the load from the canopy. For canopies having a vent, vent suspension lines are attached to the vent band. With the canopy descending vertically and fully inflated, the vent suspension lines converge downwardly in a vent suspension line confluence extending to a single, vertically extending, vent centerline. Main suspension lines are attached to the skirt band. With the canopy descending vertically and fully inflated, the main suspension lines converge downwardly in a main suspension line confluence extending with the vent centerline to a suspension line junction that is connected to a harness for the load.

One recognized problem common to the canopy and the suspension lines appears as the parachute is deployed. The suspension lines unfold until they are fully stretched. Then, the canopy unfurls and begins inflating. As that occurs, sudden shocks and other large forces are produced that can cause random failures modes, including structural failures of the canopy and/or suspensions lines. Various techniques exist to help overcome this problem, but improvement remains desirable. Thus, a need exists for a better circular parachute configuration.

SUMMARY OF THE INVENTION

This invention addresses the concerns outline above by providing a circular parachute having cascaded suspension lines. The suspension lines are cascaded in the sense that each main suspension line includes a lower segment that branches upwardly into two upper segments. That arrangement doubles the number of suspension lines connected to the skirt band of the canopy with one-half the number of lines at the suspension line junction, thereby distributing the peak opening forces more evenly along the skirt band.

There is a reduced potential of suspension lines tensioning at different times as experienced in an asymmetrical deployment. The advantage of line cascading is realized through a reduced number of suspension lines to the attach point and a reduction in distance that one upper suspension line can tension before another if on the same lower suspension line (the length of the upper suspension line is less than the total suspension line length). Both of these contribute to the reduction of asymmetrical deployments.

To paraphrase some of the more precise language appearing in the claims, a parachute constructed according to the invention includes a circularly shaped canopy having a skirt band and a plurality of main suspension lines connected to the skirt band. According to a major aspect of the invention, each main suspension line is cascaded in the sense that it includes a lower main suspension line segment that branches into at least two upper main suspension line segments. In one embodiment, ten lower main suspension line segments branch into twenty upper main suspension line segments connected to the skirt band. The ten main suspension lines converge from the skirt band toward a suspension line junction.

The circular parachute may include a vent band on the circularly shaped canopy and a plurality of cascaded vent suspension lines. In one embodiment, ten lower vent suspension segments branch into twenty upper vent suspension line segments connected to the vent band, and the ten vent suspension lines converge from the vent band toward a vent centerline that extends to the suspension line junction.

According to another aspect of the invention, there is provided means for slowing the opening of the canopy, including a generally planar reefing device defining a plurality of openings through which the main suspension lines extend (i.e., suspension-line-receiving openings). Preferably, the reefing device includes a strip of material folded into five strip segments arranged in a five-point star configuration having five strip segment junctions uniformly spaced apart at the points of the five-point star configuration. Five eyelets secure the five strip segment junctions, each of the eyelets extending through a respective one of the strip segment junctions to form the five suspension-line-receiving openings. In one reefing device embodiment, the five strips segments are portions of a nylon strap, each strap segment measuring about seventeen inches long, and the strap segments are secured with eyelets in the form of brass grommets.

Thus, the invention provides a cascaded suspension line arrangement that distributes the peak opening forces for a more even load distribution by the suspension lines that reduces the peak opening forces. In addition, the cascaded suspension lines reduce the number of lines to the attachment point by fifty percent or more. Furthermore, the use of cascaded suspension lines provides the ability to integrate suspension line materials with dissimilar physical properties (primarily elongation) in the segmented suspension lines in order to thereby tailor the opening characteristics of the parachute as desired. Moreover, the use of cascaded suspension lines provides an additional force component to control the descent of the slider (i.e., the reefing device). The angle of the upper suspension line segments that initiate the descent of the slider provide the ability to control the peak opening forces at low and high speeds. The following illustrative drawings and detailed description make the foregoing and other objects, features, and advantages of the invention more apparent.

DESCRIPTION OF THE PREFERRED EMBODIMENTS

Figure 1:
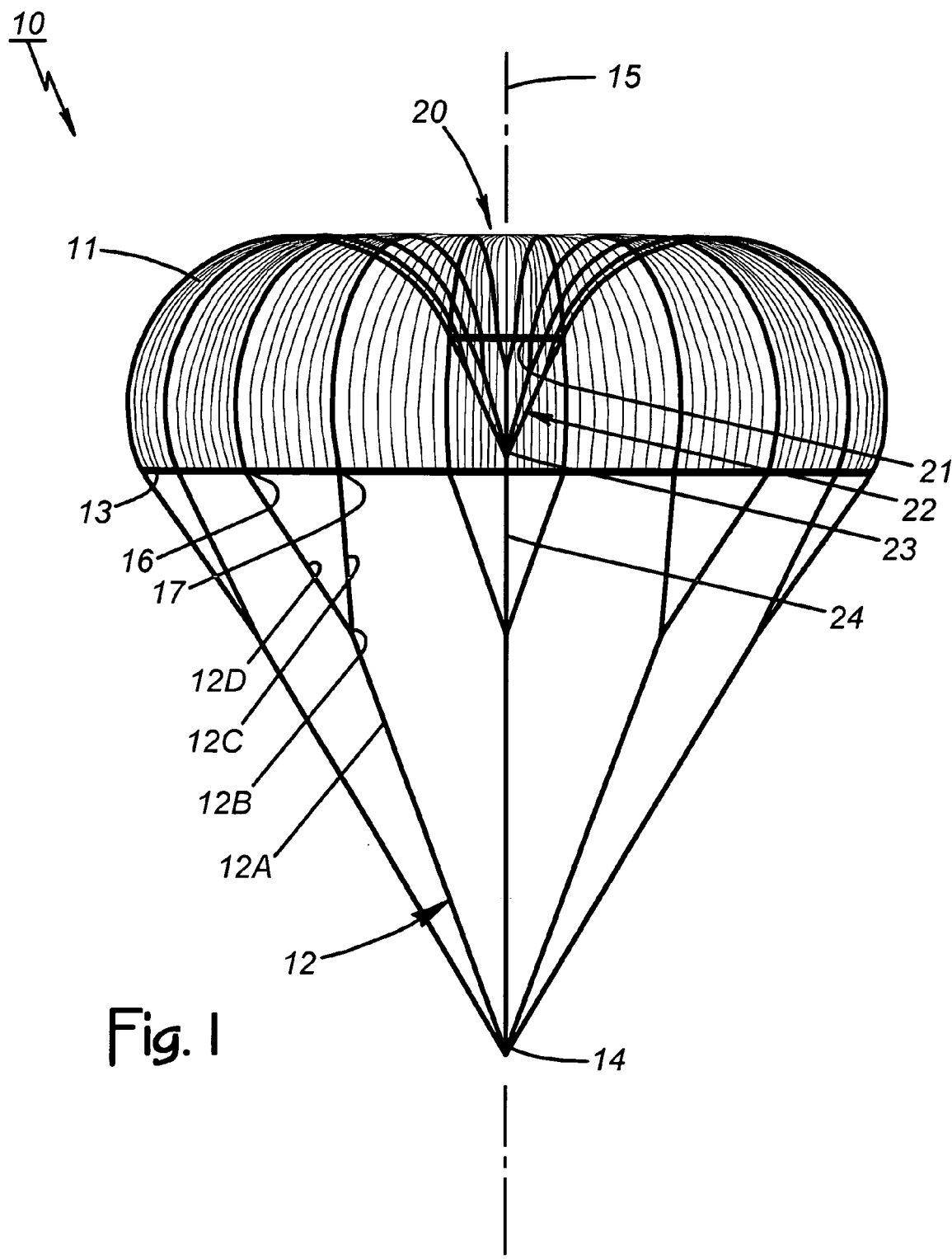
FIG. 1 of the drawings is a diagrammatic elevation view of a circular parachute constructed according to the invention, shown descending vertically with the canopy fully inflated.

FIGS. 1–5 of the drawings show various aspects of a circular parachute 10 constructed according to the invention. Generally, the parachute 10 includes a circularly shaped canopy 11 and ten main suspension lines 12. Only one of the ten main suspension lines 12 is identified with a reference numeral in FIGS. 1, 2, and 3 for illustrative purposes. The other nine main suspension lines are similar to the one that is identified.

The canopy 11 is composed of a parachute grade of nylon fabric or other suitable material (i.e., the canopy fabric) that is depicted in FIG. 1 by the shaded portion of the parachute 10. The canopy fabric is omitted from FIGS. 2, 3, and 4 for illustrative purposes, however, in order to emphasize the main suspension lines 12. The main suspension lines 12 may be of nylon composition also, and they are depicted by bold lines in FIGS. 1–4. The canopy 11 includes a known sort of circularly shaped skirt band 13 to which the main suspension lines 12 are connected in a known manner, with the main suspension lines 12 extending from the skirt band 13 to a known type of suspension line junction 14 (FIGS. 1–3) that may in turn be connected in a known manner to a load (not shown).

The canopy 11 and main suspension lines 12 may be similar in some respects to existing parachute components and they are sized according to the intended parachute application. As the parachute 10 descends vertically with the canopy 11 fully inflated as depicted in FIG. 1, the canopy 11 and the main suspension lines 12 are disposed symmetrically about a vertical central axis 15. The main suspension lines 12 converge downwardly from the skirt band 13 toward a main suspension line confluence at the suspension line junction 14.

Figure 2:
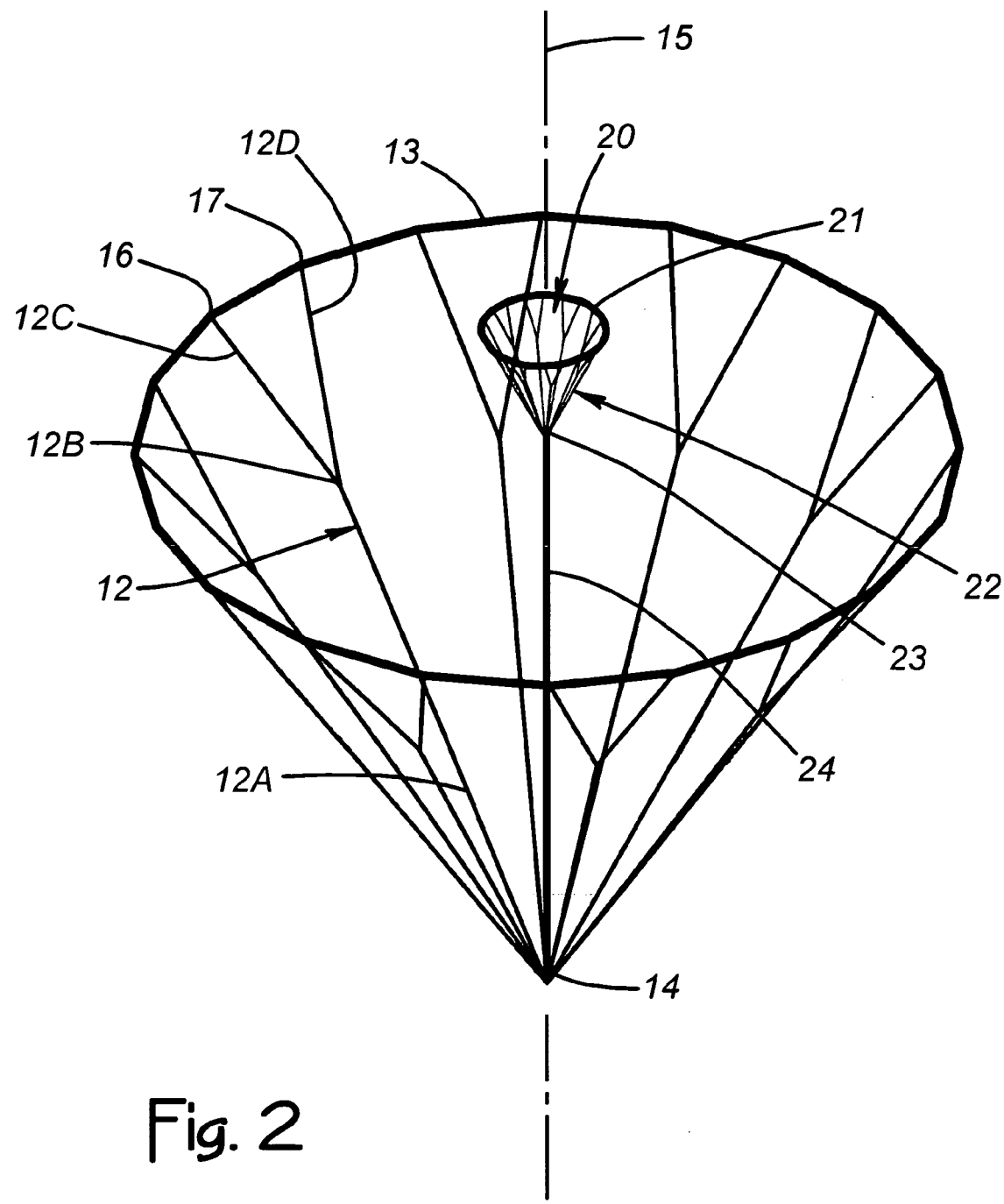
FIG. 2 is a diagrammatic isometric view of the circular parachute with the canopy fabric omitted in order to emphasize the skirt band, the main suspension lines, the vent band, and the vent suspension lines.
Figure 3:
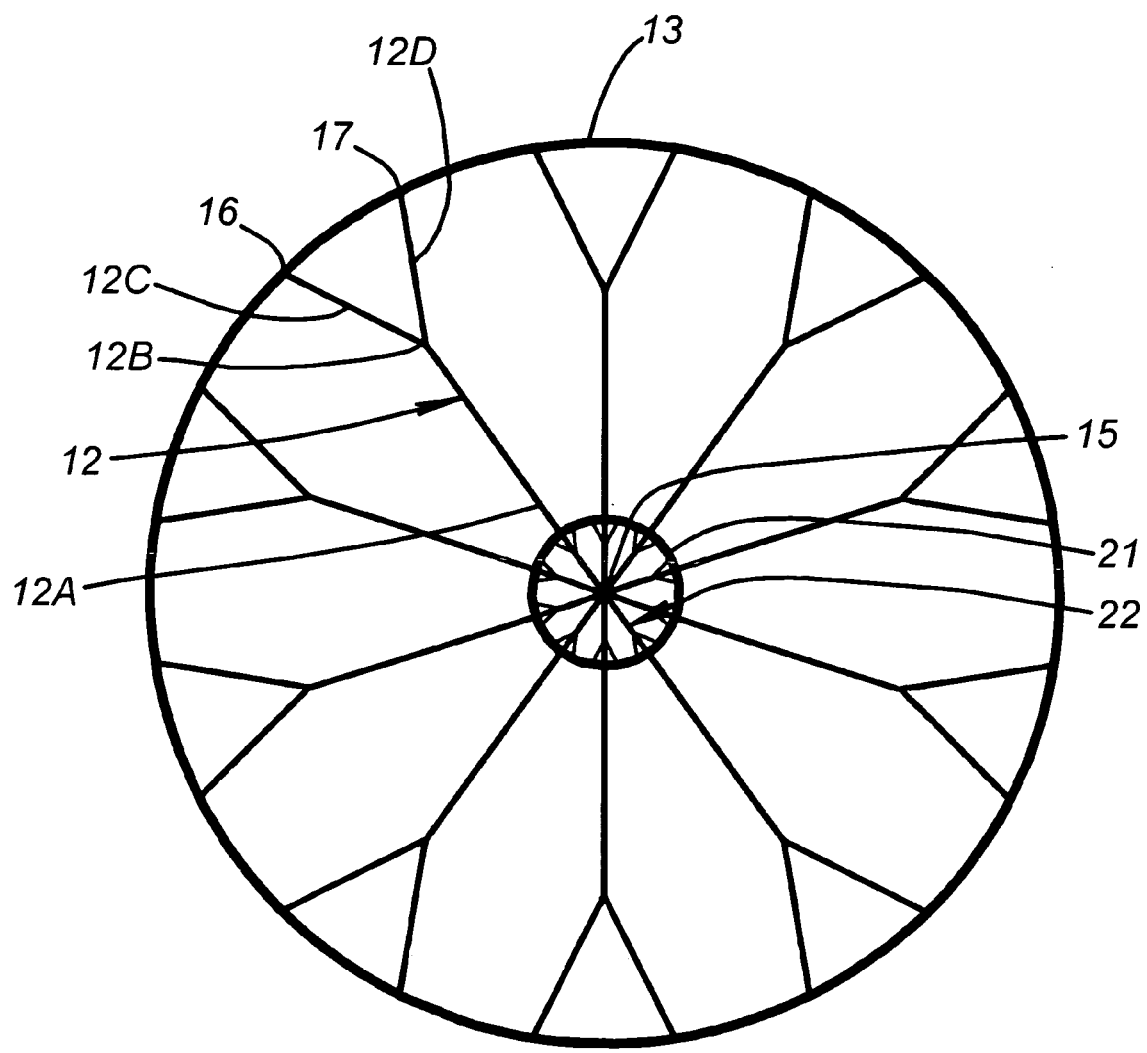
FIG. 3 is a diagrammatic bottom view of the skirt band, the main suspension lines, the vent band, and vent suspension lines as viewed looking upwardly from the suspension line junction.

According to a major aspect of the invention, each main suspension line 12 is cascaded. It is cascaded in the sense that it includes a lower segment 12A that branches upwardly at a junction 12B (i.e., a branch junction 12B) into two upper segments 12C and 12D (FIGS. 1–3). The two upper segments 12C and 12D are connected to the skirt band 13 at skirt band attachment points 16 and 17, extending downwardly from the skirt band attachment points 16 and 17 in converging relationship to each other to the junction 12B where they are tied to or otherwise suitably connected to the lower segment 12A. Preferably, the skirt band attachment points 16 and 17 (and the other eighteen unidentified skirt band attachment points) are uniformly space apart along the skirt band 13 at 18-degree intervals as illustrated in FIG. 3. The net effect of that entire arrangement of cascaded main suspension lines 12 is to provide a better force distribution with fewer lines connected to the suspension line junction 14 as stated previously. Stated another way, the main suspension lines include branch junctions such that each main suspension line includes a respective one of the branch junctions at which the lower main suspension line segment branches into the two upper main suspension line segments. The lower main suspension line segments converge downwardly to the suspension line junction 14.

In addition to the foregoing features, the canopy 11 of the illustrated parachute 10 includes a vent 20 (a circular central opening) that is identified in FIGS. 1 and 2 by an arrow 20. The vent 20 is defined by a circularly shaped vent band 21 portion of the canopy 11 that is identified in FIGS. 2, 3, and 4, with FIG. 4 being an enlarged diagrammatic view of just the vent band aspects of the parachute 10.

A plurality of ten vent suspension lines 22 are connected to the vent band 21, only one of the ten vent suspension lines 22 being identified with a reference numeral in FIGS. 1, 2, 3, and 4 for illustrative purposes. The other nine vent suspension lines are similar to the one that is identified, converging downwardly from the vent band 21 toward a vent suspension line confluence at a vent suspension line junction 23 that is connected to a vent centerline 24. The vent suspension lines 22 are tied to or otherwise suitably connected to the vent centerline 24 at the junction 23 (e.g., finger-locked loops), and the vent centerline 24 extends downwardly from there to the suspension line junction 14.

Figure 4:
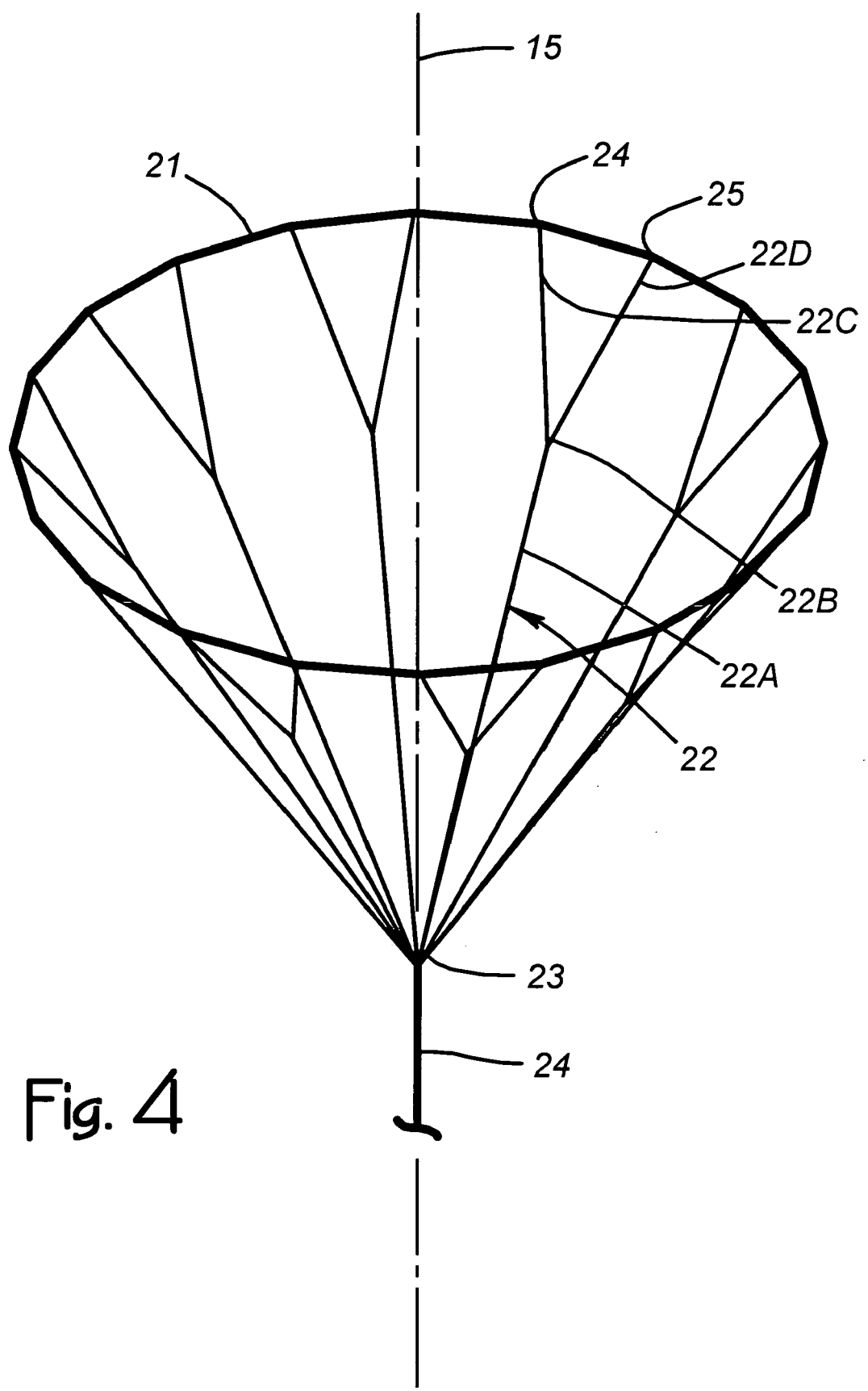
FIG. 4 is an enlarged diagrammatic isometric view of just the vent band and the attached vent suspension lines, with the vent centerline foreshortened for illustrative reasons.

Similar to the main suspension lines 12, each vent suspension line 22 is cascaded in the sense that it includes a lower vent suspension line segment 22A that branches upwardly at a vent suspension line junction 22B into at least two upper vent suspension line segments 22C and 22D (FIG. 4). The two upper vent suspension line segments 22C and 22D are connected to the vent band 13 at vent band attachment points 24 and 25, extending downwardly from the vent band attachment points 24 and 25 in converging relationship to each other to the vent suspension line junction 22B where they are tied to or otherwise suitably connected to the lower segment 22A. Preferably, the vent band attachment points 24 and 25 (including the eighteen unidentified vent band attachment points) are uniformly space apart along the vent band 13 at 18-degree intervals as illustrated in FIG. 4.

Figure 5:
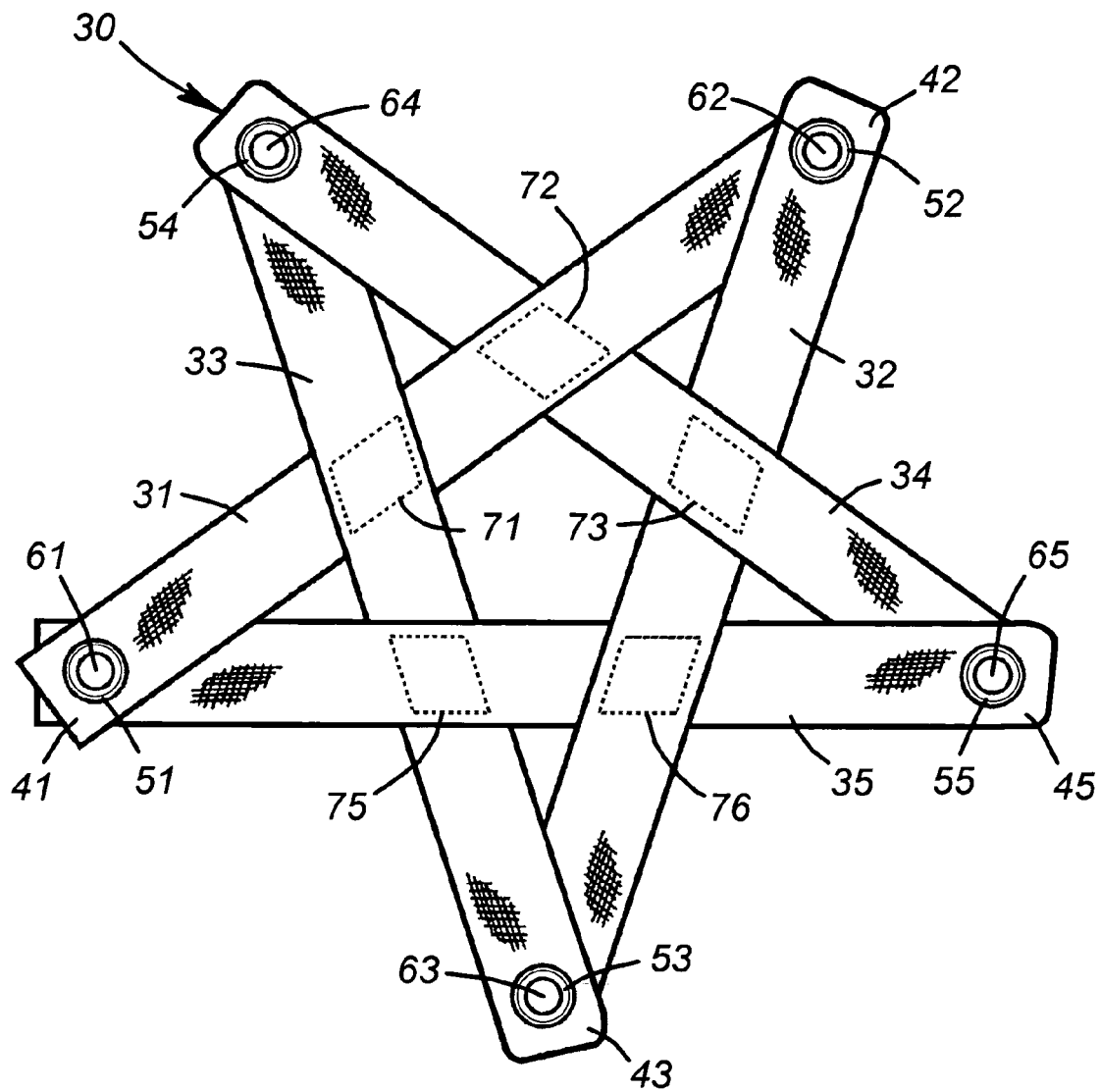
FIG. 5 is a top plan view of a reefing device for slowing the opening of the canopy.
Figure 6:
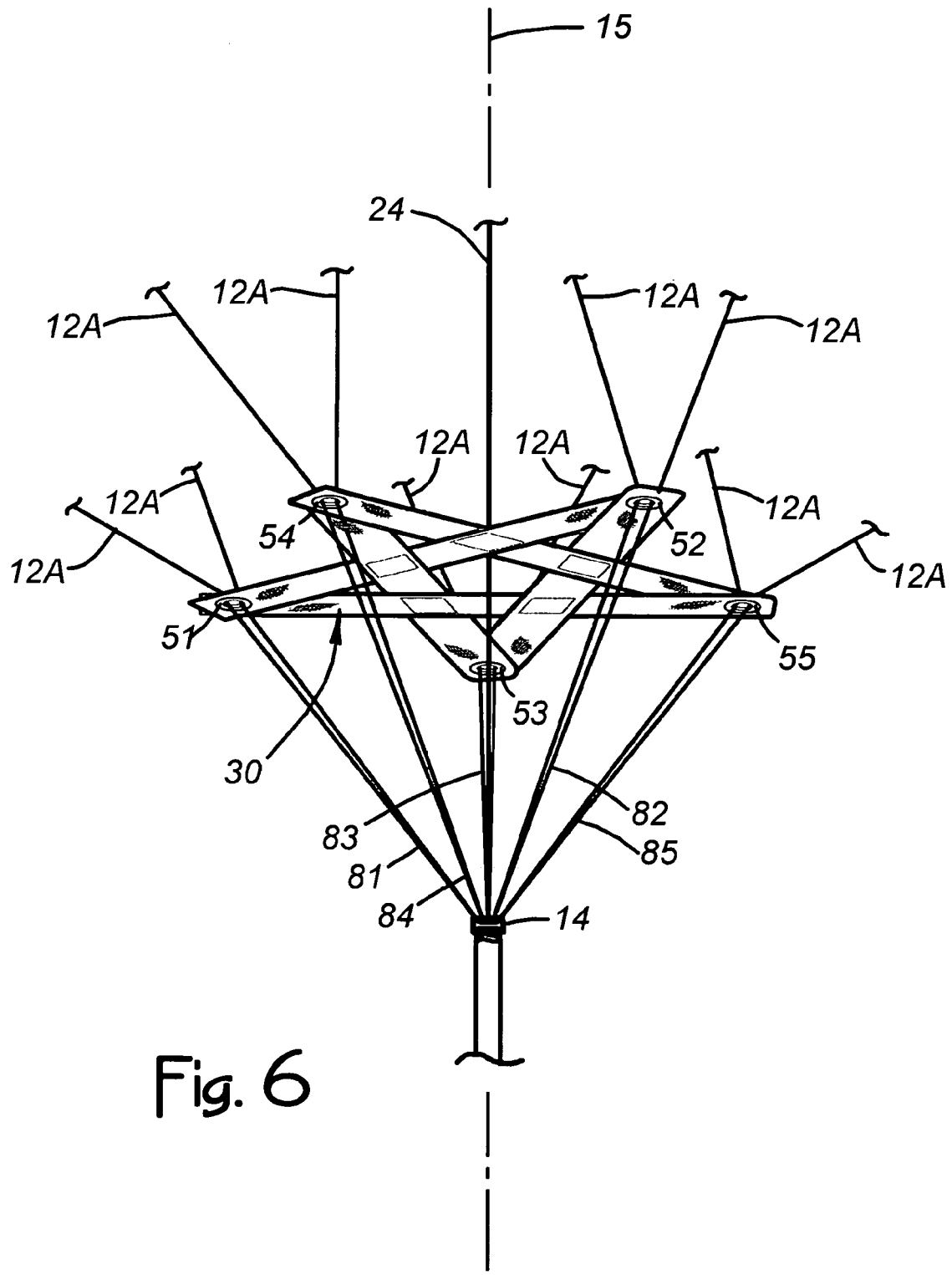
FIG. 6 is an isometric view of the reefing device showing the vent centerline strung through the central opening and the ten lower suspension lines strung through the five eyelets.

Turning now to FIGS. 5 and 6, they show various details of a reefing device in the form of a slider 30. It functions as means for slowing the opening of the canopy 11. Doing so with a reefing device is a known technique and reference may be made to U.S. Pat. No. 4,863,119 for some related details and further information. The slider is more effective during high speed deployments and does not slow the opening too much during slow speed deployments.

The slider 30 is a generally planar device fabricated from a strip of material (e.g., a nylon strap) that is folded into five strip segments 31, 32, 33, 34, and 35 (FIG. 5) that are arranged in a five-pointed star configuration. Each strip segment 31–35 is preferably of uniform length and preferably in the range of about sixteen inches to about eighteen inches for the illustrated parachute 10. The illustrated strip segments 31–35 measure about seventeen inches long and about 1.75 inches wide, although the slider 30 can be scaled according to the diameter of the parachute so that dimensioning may vary within the scope of the broader claims.

As shown in FIG. 5, the strip segments 31 and 32 are connected together at a strip segment junction 42 (at a fold in the nylon strap) by an eyelet in the form of a brass grommet 52 that defines a suspension-line-receiving opening 62. The grommet 52 may, for example, have an outside diameter measuring 1.125 inches and an inside diameter measuring about 0.675 inches. Similarly, the strip segments 32 and 33 are connected together at a strip segment junction 43 by a grommet 53 that defines an opening 63, the strip segments 33 and 34 are connected together at a strip segment junction 44 by a grommet 54 that defines an opening 64, the strip segments 34 and 35 are connected together at a strip segment junction 45 by a grommet 55 that defines an opening 65, and the strip segments 35 and 31 are connected together at a strip segment junction 41 by a grommet 51 that defines an opening 61. Stitching 71, 72, 73, 74, and 75 helps secure the strip segments 31–35.

So constructed, the slider 30 may be easily and inexpensively fabricated, and it works well with the ten main suspension lines 12 described above for the parachute 10. As shown in FIG. 6, each one of five pairs 81, 82, 83, 84, and 85 of the lower segments 12A of the ten main suspension lines 12 are strung through a respective one of the grommets 51–55 (i.e., through the five suspension-line-receiving openings 61–62 defined by the grommets), and the vent centerline 24 is strung through a central opening in the slider 30 defined by the strip segments 31–35. As the canopy 11 unfurls, the slider 30 slows the opening of the canopy 11 in a known manner, eventually moving downwardly along the main suspension lines 22 toward the suspension line junction 14 to the position shown in FIG. 6.

Thus, the invention provides a circular parachute having cascaded suspension lines so that the number of suspension lines connected to the skirt band of the canopy increases while the number at the suspension line junction decreases. In addition, a slider is provided in a five-pointed star configuration can be easily and inexpensively fabricated for use with the parachute. Although an exemplary embodiment has been shown and described, one of ordinary skill in the art may make many changes, modifications, and substitutions without necessarily departing from the spirit and scope of the invention. Some parachutes (primarily personnel parachute systems), for example, have multiple attach points (usually two to four attach points on the risers on personnel parachute systems), and the invention may be applied to those type of parachutes also within the scope of the broader claims. A ten-point star slider can be constructed with two five-point stars stacked on top of one another. As parachutes increase in diameter, the number of suspension lines increases (e.g., a 100-foot diameter parachute is likely to have about one hundred suspension lines). All such variations, including various numbers of suspension lines and slider grommets, are intended to fall within the scope of the broader claims.

What is claimed is:

1. A parachute, comprising:
a circularly shaped canopy having a skirt band;
a plurality of main suspension lines connected to the skirt band;
a vent band on the circularly shaped canopy; and
a plurality of vent suspension lines connected to the vent band;
wherein each main suspension line includes a lower main suspension line segment that branches into two upper main suspension line segments;
wherein the upper main suspension line segments of each main suspension line are connected to the skirt band;
wherein the main suspension lines include branch junctions such that each main suspension line includes a respective one of the branch junctions at which the lower main suspension line segment branches into the two upper main suspension line segments;
wherein the lower main suspension line segments converge downwardly to a suspension line junction; and
wherein each vent suspension line includes a lower vent suspension line segment that branches into at least two upper vent suspension line segments.

2. A parachute as recited in claim 1, wherein the upper main suspension line segments have a common length.

3. A parachute as recited in claim 1, wherein the parachute includes ten vent suspension lines having ten lower vent suspension line segments and twenty upper vent suspension line segments.

4. A parachute as recited in claim 3, wherein with the canopy descending vertically and fully inflated, the ten vent suspension lines converge downwardly from the vent band toward a vent centerline.

5. A parachute, comprising:
a circularly shaped canopy having a skirt band; and
a plurality of main suspension lines connected to the skirt band;
wherein each main suspension line includes a lower main suspension line segment that branches into two upper main suspension line segments;
wherein the upper main suspension line segments of each main suspension line are connected to the skirt band;
wherein the main suspension lines include branch junctions such that each main suspension line includes a respective one of the branch junctions at which the lower main suspension line segment branches into the two upper main suspension line segments;
wherein the lower main suspension line segments converge downwardly to a suspension line junction; and
wherein the parachute further comprises means for slowing the opening of the canopy, including a generally planar reefing device defining a plurality of openings through which the main suspension lines extend; a vent band on the circularly shaped canopy; a plurality of vent suspension lines connected to the vent band; wherein each vent suspension line includes a lower vent suspension line segment that branches into at least two upper vent suspension line segments.

6. A parachute, comprising:
a circularly shaped canopy having a skirt band and a vent band;
a plurality of ten main suspension lines connected to the skirt band, each main suspension line including a lower main suspension line segment that branches into two upper main suspension line segments, said ten main suspension lines extending from the skirt band to a suspension line junction; and
a plurality of vent suspension lines connected to the vent band, each vent suspension line including a lower vent suspension line segment that branches into at least two upper vent suspension line segments, said ten vent suspension lines extending from the vent band to a vent centerline that extends to the suspension line junction;
wherein the upper main suspension line segments of each main suspension line are connected to the skirt band;

wherein the upper vent suspension line segments of each vent suspension line are connected to the vent band;

wherein the main suspension lines include branch junctions such that each main suspension line includes a respective one of the branch junctions at which the lower main suspension line segment branches into the two upper main suspension line segments; and wherein the lower main suspension line segments converge downwardly to a suspension line junction.

7. A parachute as recited in claim 6, further comprising means for slowing the opening of the canopy, including a generally planar reefing device defining a plurality of openings through which the main suspension lines extend.

8. A parachute, comprising:

a circularly shaped canopy having a skirt band;

a plurality of main suspension lines connected to the skirt band;

a vent band on the circularly shaped canopy; and a plurality of vent suspension lines connected to the vent band;

wherein each main suspension line includes a lower main suspension line segment that branches into two upper main suspension line segments;

wherein the upper main suspension line segments of each main suspension line are connected to the skirt band;

wherein the main suspension lines include branch junctions such that each main suspension line includes a respective one of the branch junctions at which the lower main suspension line segment branches into the two upper main suspension line segments;

wherein the lower main suspension line segments converge downwardly to a suspension line junction;

wherein the lower suspension line segment is at least partially composed of a first material and the two upper main suspension line segments are at least partially composed of a second material that is dissimilar to the first material;

wherein each vent suspension line includes a lower vent suspension line segment that branches into at least two upper vent suspension line segments; and wherein the lower vent suspension line segment is at least partially composed of a first material and the two upper vent suspension line segments are at least partially composed of a second material that is dissimilar to the first material.

\* \* \* \* \*